June 10, 1930.   J. G. CAPSTAFF   1,762,143
FILTER AND METHOD OF PREPARING SAME
Filed Dec. 29, 1928
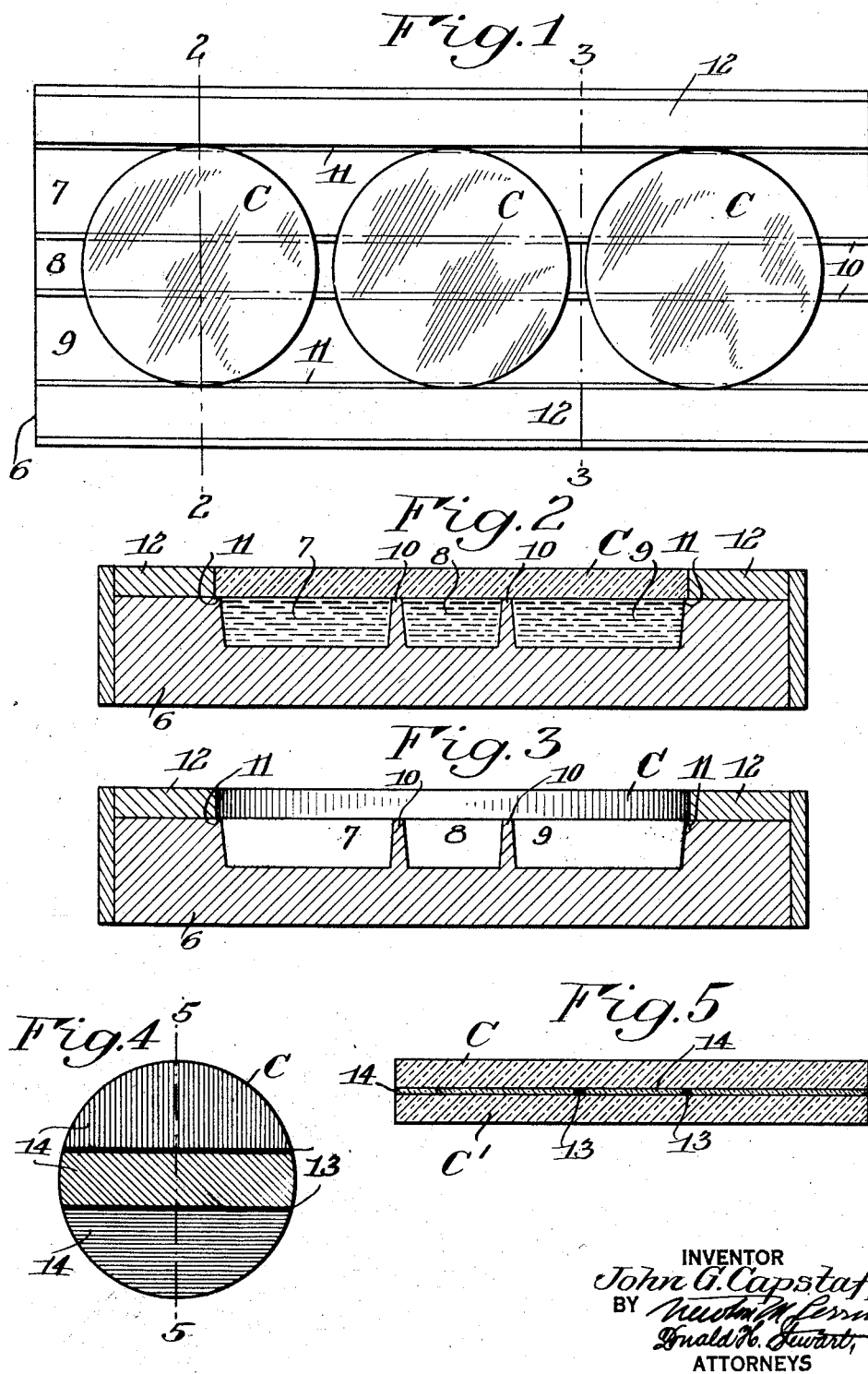

Patented June 10, 1930

1,762,143

UNITED STATES PATENT OFFICE

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK

FILTER AND METHOD OF PREPARING SAME

Application filed December 29, 1928. Serial No. 329,124.

This invention relates to the method of making color filters and more particularly to the method of making colored filters used in the system of colored photography disclosed in the United States patent to Berthon, No. 992,151, granted May 16, 1911, involving the exposing or projecting of a lenticulated film through an objective having a filter with colored areas.

In the past it has been customary to make these colored filters by taking three strips of differently colored film with their edges in engagement and cementing them between cover glasses with a solution of balsam in xylol. A solution of balsam thus used as a cement requires a long period of time even for the edges of the space between the cover glasses to be sealed. Even after this long period of time these edges easily become unsealed at temperatures encountered in use so that these glasses become separated from the colored strips of gelatin causing objectionable air spaces.

In the past it has been customary to obtain the strips of colored gelatin from large sheets of dyed films and it has been found that the density of the color is not uniform throughout so that it has been necessary to carefully select the portions used from the sheets in order that there may be a proper color ratio between the three colors used.

In accordance with the present invention a new method has been devised for making filters having different colored areas in which the intensity of the color of any section may be closely regulated without the necessity of selecting portions from a large sheet and in which a fused cement may be used which dries immediately on cooling so that the time of manufacturing is greatly reduced. In addition the present method is much more flexible than methods previously in use since it permits a variation in the color ratio between different sections merely by varying the color intensity of the gelatin solution used.

For a clearer understanding of the invention reference is made to the drawings in which Fig. 1 is an enlarged plan view of a mould for use in connection with the present method, having three cover glasses for three different color filters, placed on the top of the mould. Fig. 2 is a sectional view taken on the line 2—2 of Fig. 1 showing the form of the mould with three differently colored or dyed solutions of gelatin therein and a cover glass in place. Fig. 3 shows a sectional view taken on the line 3—3. Fig. 4 is an enlarged plan view of a finished filter having three color areas while Fig. 5 is a section of this filter taken on the line 5—5 of Fig. 4.

In accordance with the present method a mould 6 is used, which may be of any length and which is provided with three longitudinal grooves 7, 8 and 9 separated by ribs 10. The top surface 11 of the mould and the tops of the ribs 10 lie in the same horizontal plane so that when a cover glass C is laid on the mould between the guides 12 it will touch each of these surfaces as shown in Figs. 2 and 3. The lower surface of the cover glass C is treated in the same manner as photographic plates so that gelatin will adhere thereto while the mould 6 is prepared, as by cleaning with gasoline, so that the gelatin will not adhere thereto. With the cover glass in position on the mould as shown in Figs. 1 and 2 a warm solution of gelatin, dyed red and carefully prepared by an exact formula so that it will have the proper thickness when dried, is introduced in the space between the cover glass C and the bottom of the groove 7 by means of a pipette and capillary attraction is responsible for the colored gelatin flowing evenly throughout this space. If the amount of gelatin introduced under each cover glass is closely regulated, the lower surface of the cover glass will be exactly covered so that there will be no need for trimming off any excess film. Similarly a like warm solution of gelatin dyed green is introduced into the groove 8 and a warm solution of gelatin dyed blue is introduced in the same manner into the groove 9. The grooves 7, 8 and 9 may be $\frac{1}{10}$ of an inch in depth and if the gelatin has been properly prepared it will shrink to a film about $\frac{1}{10}$ of its former thickness but still adhering to the under surface of the cover glass C.

When the gelatin is thoroughly jellied, the cover glass C is removed from the mould and placed jelly side up in a drying cabinet. After drying, the spaces such as 13 between adjacent strips of film 14 may be filled with black opaque lines or these spaces may be rendered opaque by black strips applied on a cover glass C'. This cover glass is cemented in place by the use of hot fused balsam, which hardens when cold, so that the filters are ready for use in a comparatively short time. It is possible to use the fused balsam in cementing the cover glass C' in place because the films are mounted on the cover glass C whereas in former methods where it was necessary to cement the dried strips of films 14 of colored gelatin to both cover glasses, it was necessary to use a solution of balsam because the unmounted strips of gelatin were so delicate that they would be injured by the heat of the fusal balsam. Since the lower cover glass C' is cemented in place by fused balsam such as is used in lens mounting, which has a very much higher melting point than the balsam solution, there is not the tendency of the cover glass to become uncemented as in the case where balsam solutions with a necessarily lower melting point are used.

In the foregoing description the words red, green and blue, used to describe filter areas have the following significance: red denotes transmission of substantially all of the red region of the spectrum and absorption of almost all of the other colors; green denotes transmission of the green almost exclusively; while blue denotes transmission of only the blue or violet.

It is obvious that there may be various modifications of the present method and that other equivalents of gelatin may be employed to produce the layer or filter material all within the scope of the appended claims.

Having thus described my invention what I claim as new, and desire to secure by Letters Patent is:

1. The method of manufacturing color filters which comprises applying by capillary attraction a layer of uniform thickness of a colored solution to the surface of a transparent plate, allowing the layer of solution to dry, and cementing a transparent cover plate to said layer.

2. The method of making color filters which comprises treating a transparent place so that a film will adhere thereto, and moulding a layer of colored film of uniform thickness on the surface of the plate so treated.

3. The method of making color filters which comprises placing a transparent plate on the top of a mould, introducing a colored solution in the space between the bottom of the mould and said plate, causing the solution to dry as a film on said plate, and applying a transparent covering to the film after removing the plate from the mould.

4. The method of making color filters which comprises placing a transparent plate on the top of a mould, introducing a colored solution by capillary attraction in the space between the bottom of the mould and said plate, causing the solution to dry as a film on said plate, and cementing a transparent cover plate to the film after removing the plate from the mould.

5. The method of manufacturing a filter having a plurality of color areas which comprises moulding strips of colored material in adjacent relation upon a cover plate, and rendering the joint between adjacent strips opaque.

6. The method of manufacturing filters having a plurality of color areas which comprises moulding several strips of different colors in closely adjacent relation on a transparent plate, placing a band or opaque material closing the space between adjacent edges of said strips, and attaching a transparent cover plate to said strips.

7. The method of making a filter having a plurality of color areas which comprises treating a transparent plate so that gelatin solution will adhere thereto, moulding strips from differently colored solutions of gelatin on the surface of the plate so treated, and cementing a transparent cover plate to said strips with a fused cement.

8. The method of manufacturing a filter having a plurality of color areas which consists in placing a transparent cover plate on the top of a mould having a plurality of grooves arranged in parallel relation to bridge said grooves, introducing by capillary attraction a differently colored solution for each groove, each solution completely filling the space between the cover plate and the bottom of the groove, causing said solutions to dry as a film adhering to the surfaces of the cover plate, rendering the space between adjacent strips of film opaque, and applying a protective covering to the exposed surfaces of said strips of film, the last two steps being performed after removing the plate from the mould.

9. The method of manufacturing a film having a plurality of color areas which comprises placing a series of transparent cover plates in spaced relation on the top of a mould having a plurality of parallel grooves of substantial length to bridge said grooves, introducing by capillary attraction a differently colored solution in each groove to fill completely only the space between the bottom of the groove and said cover plates, causing said solutions to dry as strips of film on said cover plate, and placing a band to close the space between adjacent strips of film, and fastening a protective cover to said strips of film after removing the cover plate from the mould.

10. A color filter comprising a cover plate, three parallel bands moulded on said cover plate, the several bands transmitting light predominately in different portions of the spectrum, and means including opaque material bridging the space between adjacent bands.

11. A color filter comprising a cover glass, three parallel bands moulded on said cover glass, the several bands transmitting light predominately in different portions of the spectrum, opaque means closing the space between adjacent bands, and a cover plate cemented to said bands by fused balsam.

Signed at Rochester, New York, this 21st day of December, 1928.

JOHN G. CAPSTAFF.